US011069231B2

(12) United States Patent
Eilertsen et al.

(10) Patent No.: US 11,069,231 B2
(45) Date of Patent: Jul. 20, 2021

(54) METHOD AND SYSTEM OF LINEAR ROAD SAMPLING PROVIDING ROAD TRAFFIC FLOW MEASUREMENTS

(71) Applicant: Roger André Eilertsen, Askim (NO)

(72) Inventors: Roger André Eilertsen, Askim (NO); Nebojša Gvozdenović, Palić (RS); Nenad Mirkov, Subotica (RS); Karlo Bala, Novi Sad (RS)

(73) Assignee: Roger André Eilertsen, Askim (NO)

( * ) Notice: Subject to any disclaimer, the term of this patent is extended or adjusted under 35 U.S.C. 154(b) by 0 days.

(21) Appl. No.: 15/761,720

(22) PCT Filed: Sep. 21, 2016

(86) PCT No.: PCT/NO2016/050191
§ 371 (c)(1),
(2) Date: Mar. 20, 2018

(87) PCT Pub. No.: WO2017/052381
PCT Pub. Date: Mar. 30, 2017

(65) Prior Publication Data
US 2018/0365988 A1    Dec. 20, 2018

(30) Foreign Application Priority Data

Sep. 22, 2015    (NO) .................................... 20151236

(51) Int. Cl.
*G08G 1/01* (2006.01)
*G01C 21/32* (2006.01)
(Continued)

(52) U.S. Cl.
CPC ........... *G08G 1/0145* (2013.01); *G01C 21/32* (2013.01); *G08G 1/0112* (2013.01); *G08G 1/0133* (2013.01); *G08G 1/0141* (2013.01); *H04W 4/029* (2018.02); *H04L 67/12* (2013.01); *H04W 4/70* (2018.02)

(58) Field of Classification Search
CPC .. G08G 1/0145; G08G 1/0141; G08G 1/0133; G01C 21/32; H04W 4/029
See application file for complete search history.

(56) References Cited

U.S. PATENT DOCUMENTS

| 5,530,441 A | 6/1996 | Takatou et al. |
| 7,480,560 B2 | 1/2009 | Boll |

(Continued)

FOREIGN PATENT DOCUMENTS

WO    2013/134863    9/2013

OTHER PUBLICATIONS

International Search Report dated Feb. 7, 2017 in corresponding International Application No. PCT/NO2016/050191.
(Continued)

*Primary Examiner* — Ramsey Refai
(74) *Attorney, Agent, or Firm* — Wenderoth, Lind & Ponack, L.L.P.

(57) ABSTRACT

A computer implemented method providing measurements of traffic flow conditions on selected roads, wherein selection of roads is according to a linear sampling of roads and traffic measurements is provided from raw data being qualified by road users participating in the measurement scheme.

10 Claims, 3 Drawing Sheets

Figure 1:
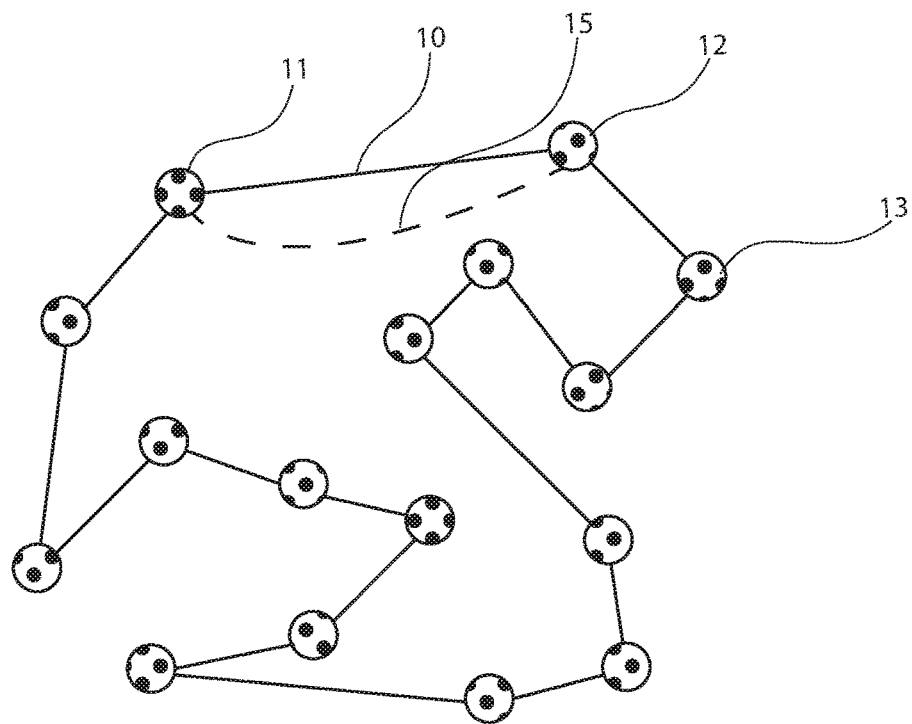

(51) Int. Cl.
*H04W 4/029* (2018.01)
*H04W 4/70* (2018.01)
*H04L 29/08* (2006.01)

(56) References Cited

U.S. PATENT DOCUMENTS

| | | | |
|---|---|---|---|
| 7,813,870 B2* | 10/2010 | Downs | G08G 1/0104 |
| | | | 340/995.13 |
| 9,109,909 B2* | 8/2015 | Schilling | G01C 21/32 |
| 9,989,367 B2* | 6/2018 | Bartels | G01C 21/26 |
| 2004/0102893 A1 | 5/2004 | Atkinson | |
| 2007/0143011 A1* | 6/2007 | Sato | G01C 21/3461 |
| | | | 701/417 |
| 2011/0035146 A1 | 2/2011 | Guha et al. | |
| 2013/0211706 A1 | 8/2013 | MacNaughtan et al. | |
| 2014/0136089 A1* | 5/2014 | Hranac | G08G 1/0962 |
| | | | 701/118 |
| 2015/0081196 A1* | 3/2015 | Petty | G08G 1/0133 |
| | | | 701/118 |
| 2016/0078756 A1* | 3/2016 | Basalamah | G08G 1/0112 |
| | | | 701/117 |

OTHER PUBLICATIONS

Norwegian Search Report dated Feb. 12, 2016 in corresponding Norwegian Application No. 20151236.

\* cited by examiner

METHOD AND SYSTEM OF LINEAR ROAD SAMPLING PROVIDING ROAD TRAFFIC FLOW MEASUREMENTS

TECHNICAL FIELD

The present invention relates to a method and system thereof providing qualified traffic measurements by linear road sampling, wherein traffic flow measurements are qualified by human interaction with the system.

BACKGROUND

Monitoring and analysis of measured traffic flow conditions on city roads are indicators that may identify for example upcoming traffic congestions, or congestions that are about to dissolve, but also to identify roads with less traffic problems being possible roads road traffic can be directed to when traffic congestions occur.

There are many examples of methods and systems measuring traffic flow conditions in prior art. For example, deployment of sensors like pressure sensors buried in the road body, or optical means on the side of roads may count numbers of cars passing per time unit at selected points at different sections of the roads. This is then a measurement of the traffic flow rate (number of cars pr. time unit) at the specific locations of the measurements. However, linking traffic flow conditions and measured traffic flow rates can be difficult. For example, if there is a queue that stands still the measured traffic flow rate is zero. This parameter is also zero when there are no actual cars passing the point. Therefore, interpreting traffic flow rate may provide a misleading assessment of traffic flow conditions.

When a high traffic flow rate is measured this may indicate that the traffic passes a measurement point with high or normal speed. However, as known in prior art, such a traffic flow condition can quickly turn into a severe queue problem if just one car accidently hits the brakes for a second or two. Such short disruptions of the traffic flow is known from traffic queue theories to be able to create long lasting queue problems when the traffic density is high. Therefore, interpreting the traffic flow conditions may also be misleading when the traffic flow rate indicates high throughput of cars. This specific traffic condition is a vulnerable traffic situation.

U.S. Pat. No. 5,530,441 disclose a method and an apparatus measuring traffic flows inside a crossing, or near the crossing, with a number of cameras. The method and apparatus are capable of extracting vehicles with a high level of accuracy. Overlap of vehicles identified by the cameras can be avoided by setting the field of a camera to exclude a range from the inflow portion to the vicinity of centre of the crossing but to include a range from the centre to the vicinity of the outflow portion of the crossing. Accordingly, accuracy of traffic flow measurements can be improved. However, traffic flow conditions are not only related to what happens around a crossing. An incoming traffic lane to the crossing may be empty of cars because there is a wide heavy weight transport truck blocking traffic on the incoming lane far away from the crossing, or there has been an accident etc.

U.S. Pat. No. 7,480,560 disclose a method and apparatus providing traffic density and traffic flow information obtained from wireless devices. The wireless devices may be wireless telephones having Global Positioning System (GPS) capabilities. A server interacts with the wireless telephones compiling the traffic density and flow information from acquired GPS position readings. The traffic density and flow information is then available for dissemination to requesting wireless telephones, or other requesting clients capable of contacting the server. However, it is difficult to interpret measurement of car movements relative to other car movements on a same limited road segment if they travel with significantly different speed. The accuracy of an assessment of traffic flow conditions like this is based on an assumption that all road users providing GPS measurements are acting more or less the same way in the traffic.

US 20130211706 A1 disclose systems and methods estimating the speed of a mobile radio terminal traveling on at least one road segment. The systems and methods may further determining one or more routes through a road network that a mobile radio terminal could have travelled based on a sequence of wireless measurements from the mobile radio terminal. In addition, the systems and methods may be collecting and transmitting radio communications network measurements from a mobile terminal for use in a system of estimating a traffic flow speed on road segments. In examples of embodiments, the process of accumulating and communicating a plurality of wireless measurements is to a traffic flow measurement server such that reporting of wireless measurements is minimized when the mobile radio terminal is stationary.

Another problematic situation may arise if a server is tracking for example a taxi. It is common that a taxi may stop in the middle of the road to pick up passengers. Interpreting this situation as an upcoming queue condition is possible since the traffic flow rate measured by the taxi is zero, and a few cars may start to pile up behind the stopped taxi. This is also an example of how difficult it can be to measure traffic density. If cars starts to pile up as discussed above, the traffic density is very high over for example 50 meters behind the taxi, while the traffic density may be assessed as moderate if measured over 100 meter instead. A further problem with traffic density measurements is that cars can be lumped together in dispersed lumps on a road. Further, tracking a taxi that is allowed to travel in traffic lanes dedicated to public transport could indicate high speed, low car density and no problems on the highway when indeed the other lanes of the highway is stacked with cars.

The human ability to interpret and assess complex traffic situations is best illustrated by the fact that most cities having traffic control systems uses deployed live video surveillance cameras being viewed and interpreted by human operators in traffic control centres. The traffic controllers can regulate for example traffic light settings to improve traffic flow conditions in respective areas based on their impression of current traffic patterns and experience of traffic behaviour in the city they control. However, such systems have few means of guiding specific road users experiencing difficult traffic situations. Such systems provides no feedback to specific road users being located at specific locations.

Another aspect of prior art traffic measurement techniques is that regardless of how measurements are done, due to often rapid changing traffic conditions like for example an accident, traffic flow measurements have a limited scope of validity over time.

From a road user perspective, it can be of help to be informed about traffic problems ahead of the road positions a road user is located on at any time. However, what a road user needs to know is where there are open roads, i.e. roads with acceptable transport capacity, and not so much, where it is not. It is of course possible to identify open roads when it is known where there are traffic problems. However, due to the ongoing changing traffic conditions in a road system the "open roads" as such is also changing over time. In prior art it is known how to update computer coded maps wherein roads with problems can be coloured red, and "open" roads are coloured green, while roads being in a transitional state is for example coloured yellow.

Even though it is known how to report traffic conditions to road users, it is still a question related to the quality of the measurements and assessments of road traffic conditions. If the quality of the measurements are low, then the benefit of receiving traffic related information is non-existing. On the contrary, such information may be misleading information.

There are examples of navigation tools that can receive reports of accidents for example, and which will automatically identify routes around the accident. However, it is usually the same algorithm used in many navigation tools resulting in a situation wherein too many cars are directed to the same alternative route resulting in a queue condition on this alternative road. When there is a traffic congestion, it is also a matter of definition of defining what is an open road or a road with acceptable transport capacity. If most of the traffic is standing still, a road with some moderate traffic flow is much more attractive to use than those that are blocked. Therefore, traffic flow rates may be relative measures. When measuring traffic flow conditions, the validity of respective parameters that are measured depends often on surrounding conditions as well as the situation at a specific measurement point. Further, an assessment of surrounding conditions around a measurement point is actually a rather fluffy concept. It is more or less just an impression of how it is. It is not an accurate measurable parameter value. Even though when using a collection of different measured parameters analytically to provide an indication of surrounding traffic conditions, the traffic is also subject to random non-predictable events like accidents and the condition estimate will not be valid.

Therefore, it is a need of a method and system thereof providing improved traffic flow measurements and assessments of traffic conditions.

OBJECT OF THE INVENTION

In particular, it may be seen as an object of the present invention to provide a method and system that overcome the problems of prior art by qualifying traffic flow measurements with human observation capabilities located on premises of respective traffic flow measurements.

It is a further object of the present invention to provide an alternative to prior art.

SUMMARY

Thus, the above described object and several other objects are intended to be obtained in a first aspect of the invention by a method and system thereof, wherein a configured computer server executes steps of a method activating road users participating in a traffic flow measurement scheme, wherein road users are instructed to drive between a first selected junction to a second selected junction according to an optimized selection of junctions in a geographical area.

According to an aspect of the invention, a computer-implemented method providing measurements of traffic flow conditions on roads selected by linear road sampling comprises a server configured to execute steps of:
specify a region covering a road system to be measured;
identify sample junctions that cover the region according to a specific rule of coverage;
create a plurality of equivalent sectors around each of the sample junctions that cover the full circle around the respective sample junctions;
for each sample junction and each of its sectors: identify closest junctions in a sector and identify shortest paths from/to the sample junction to the closest junctions (k);
store all paths into a directed graph, wherein the nodes represent the junctions;
update traffic flow measurements and measurements qualified by road users in nodes of the graphs by tracking cars following respective shortest paths identified above.

FIGURES

The method and system according to the present invention will now be described in more detail with reference to the accompanying figures. The figures illustrates examples of embodiments of the present invention and is not to be construed as being limiting to other possible embodiments falling within the scope of the attached claim set. Further, respective examples of embodiments may each be combined with any of the other examples of embodiments.

Figure 2:
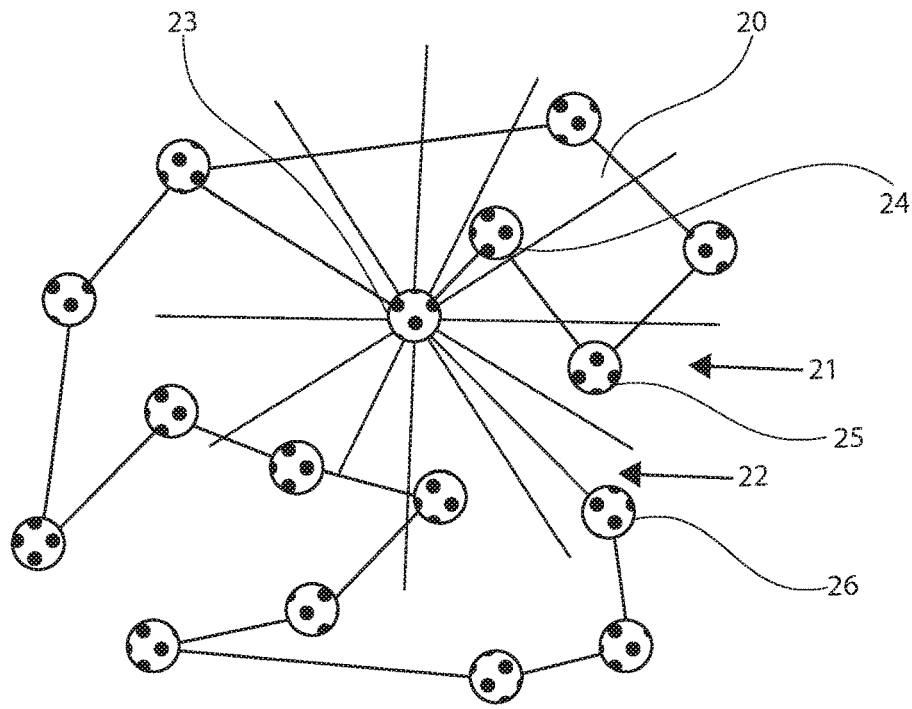
Figure 3:
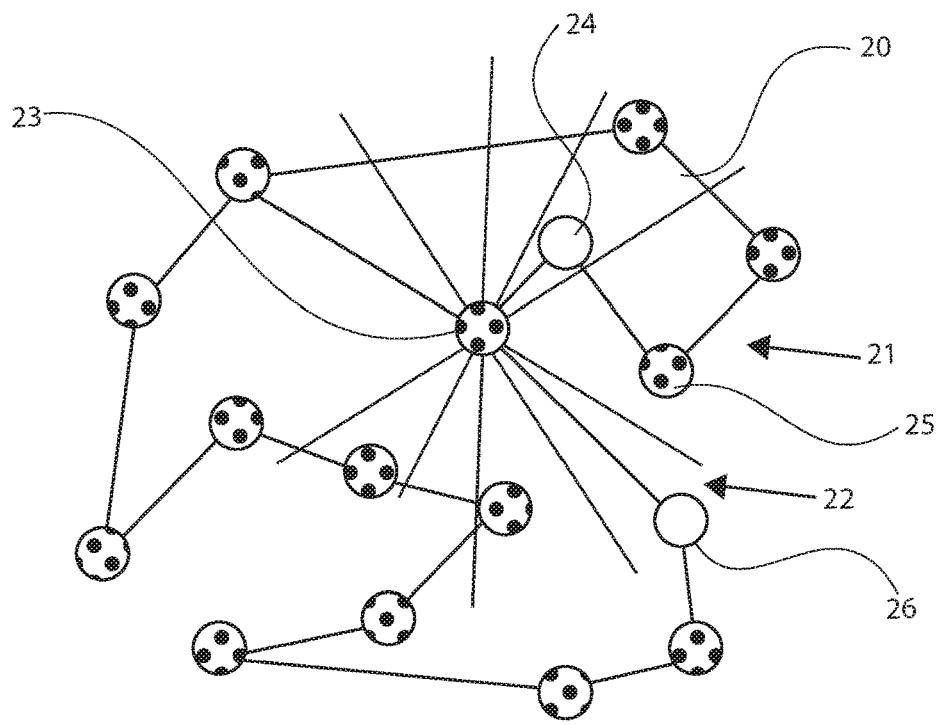
Figure 4:
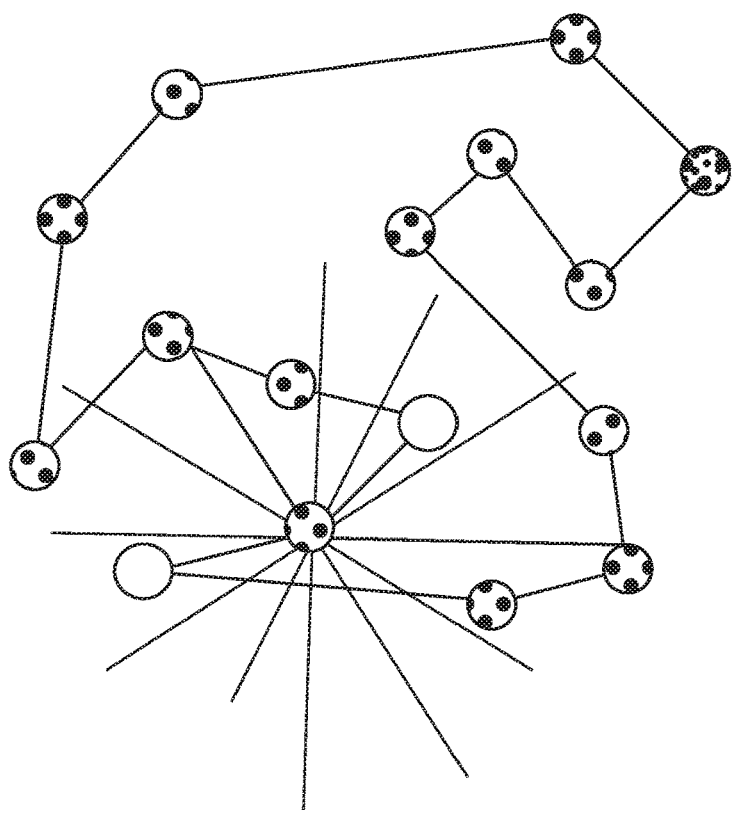
Figure 5:
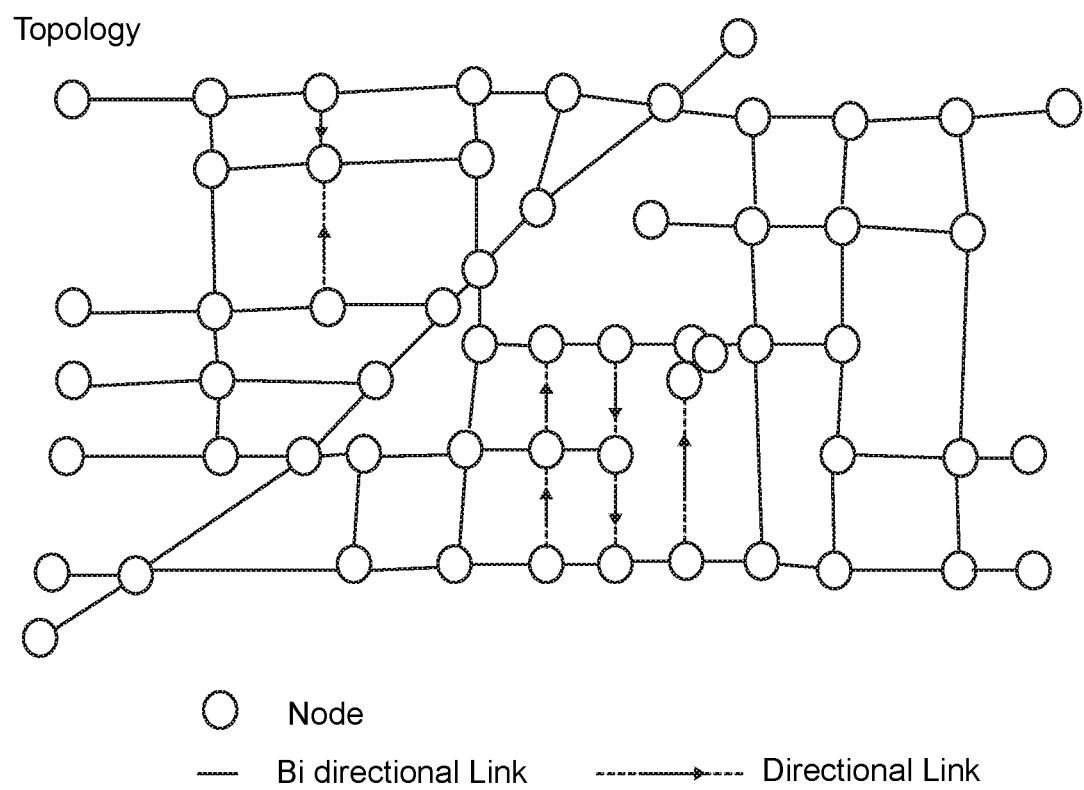

FIG. 1 illustrate an aspect of the present invention.
FIG. 2 illustrates another aspect of the present invention.
FIG. 3 illustrates an example of embodiment of the present invention.
FIG. 4 illustrates a further result of the embodiment illustrated in FIG. 3.
FIG. 5 illustrates an example of a directed graph.

DETAILED DESCRIPTION

According to an aspect of the present invention, uncertainty of traffic flow assessments may be mitigated if humans located at the premises of specific traffic measurement points are qualifying the measurements.

According to a further aspect of the present invention, multiple road users carrying mobile terminals like a mobile phone integrated with Global Positioning System (GPS) transceivers can provide GPS measurements used as raw data for traffic assessments or analysis. Qualifying for example GPS measurements sent to a server by adding a text message incorporating a qualifier of the measurements like "good conditions", "starting to be difficult" etc. will provide a better interpretation of the measurements. It is also possible that the server receiving the GPS based measurements submits questions to respective road users asking road users to answer "yes" or "no" to respective questions related to the surrounding traffic environment. For example answering "yes" or "no" to standardized questions like "Is the traffic density around your current position moderate?" etc.

According to an aspect of the present invention, qualifiers submitted by road users may be coded with unique number identifications, for example "10" is the identification of the qualifier "good conditions".

However, it is also a question of how many road users needs to be part of a scheme like this to get proper traffic condition assessments of a large city at given time intervals. A further question is if it is actually necessary to measure every road in the city. If a main road have traffic congestions, it is obvious that many side roads guiding traffic onto the main road also have traffic problems. In such a situation, an interesting question would be if there were roads with less traffic problems providing a route around such congestions. If humans are involved in the measurement scheme a human may be capable of finding such an alternative road based on actual observations as well as local knowledge about roads in the area in question. When the server is tracking the road users travelling on alternative roads, the roads are identified by the server and can be used to guide traffic, or part of the traffic, onto these alternative roads to other road users coming from behind the road user that makes the measurements and qualifies the measurements.

Therefore, a further aspect of the present invention is that a server may request a road user to travel from a point A to a point B. The server makes GPS based tracking and measurements of the movement of the road user, and when the road user is coming for example to the point B, the server requests a qualifier of respective traffic related measurements from the road user. This may include subjective assessments by the road user, or a subjective prognosis of future traffic conditions etc.

According to a further aspect of the present invention, by selecting starting points A and ending points B according to a specific optimization algorithm according to the present invention, the number of road users participating in the measurements may be limited when assessing traffic conditions of a complete city, even when such assessments are performed on a regular basis.

There is also an important bias of traffic patterns in cities due to the fact that city planners design special main roads carrying the burden of traffic in and out of subareas of the city, or for traffic passing the city, or for transport vehicles etc. In addition, it is possible to close or restrict traffic in parts of a city during daytime, or during rush hours etc. Some cities have also introduced rush hour fees making it expensive to use roads at certain times of a day. In a sense, this provides planned traffic patterns.

Therefore, it is possible to link the above referenced points A and B to reflect such planned traffic patterns. It is for example also possible to have live feedback from traffic control centres controlling traffic light settings to ease traffic congestions in certain areas of a city.

FIG. 1 illustrate an example of a route 10 between respective junctions 11, 12, 13, etc. How a road user will travel between the junctions can of course be random. However, if the road user wants to travel between the junctions as illustrated in FIG. 1, an optimized route 10 can be viewed as an optimized result achieved with what is known in prior art as a shortest path algorithm. If a road segment of the route 10 is blocked, an optimized route is not available. A road user may then find and use an alternative road 15 for example when driving from junction 11 to junction 12. If the server is tracking the GPS positions of the road user, the alternative road is registered in the server. Then this alternative route is actually part of the optimized route in the meaning of providing transport capacity to the road user. This is an example of the shortcomings of static maps. Planning routes based on static maps does not take into account available roads.

There are some facts and intuitive understandings derivable from the situation in FIG. 1 based on common knowledge of road systems.

A shortest path algorithm identifies a shortest geographical route between junctions A and a junction B.

If junction B is located geographically close to junction A on a shortest path, it is unlikely that there is a further junction located in between junction A and junction B on this shortest path.

Junctions are fixed objects, and there are many possible different routes between junctions on a plurality of roads interconnecting junctions.

Road users are capable of identifying alternative routes through an area based on observations of traffic patterns and local knowledge of an area.

Therefore, a server may instruct road users to be part of a scheme measuring road conditions on a plurality of roads in and out of junctions being located at fixed geographical points. As a result, it is possible to guide road users on alternative roads (which is a variable resource) around junctions (which are fixed resources) with problems, or which are connected to roads with problems.

However, when finding an alternative road the number of fixed junctions necessary to pass may grow, hence the number of junction pairs leads to a quadratic growth in computational cost. It is a problem of connecting many points to many points. Therefore, instructing road users to drive randomly between fixed junctions may result in high computational cost. A city may have thousands of roads and junctions.

It is possible to make the assumption that if a server instructs a road user to drive from a point or junction A to another point or junction B, wherein the geographical distance between A and B is short, the road user will probably follow a direct shortest road connecting A and B. Then there is a low probability that there is a further junction located in between A and B. Therefore, following short stretches of roads in between closely located junctions, results in measurements related only to conditions on roads between junctions. If a road between junction A and B is intersected by another road the crossing of this road may have traffic interfering with the measurements of the road between A and B. The traffic between A and B may be low, but if the traffic on the crossing road is very high, the traffic in the junction between the roads may block the traffic on the road between A and B. This would then corrupt the measurements on the road between A and B.

Based on this assumption, it is possible to select a plurality of pairs of junctions A and B wherein the distance between A and B is shortest possible. It is further possible to make the assumption that there is no known existing road between junction A and junction B since it is possible that the existing road is blocked. Therefore, when instructing a road user to drive between a pair of junctions A and B, the road user driving a car is using his navigational skills on the ground to follow a route of his selection. Since the distance is short, it is a very high probability that he will follow an existing connecting road, but if the road is blocked, he will at least try to find a road around the blocked road. The blocked condition may already have been identified in a previous measurement by another road user, or by any other means.

If only measuring short stretches of a route segments between two points A and B located far away from each other, there will be many short stretches between a pluralities of junctions located along the route. It is an intuitive derivable fact that if a short stretch of route, for example between junction A towards junction B, have slow moving traffic there is a high probability that there are slow moving traffic out onto roads from junction B as well. If one also takes into account effects of city planning of the road network there is even a higher probability of slow moving traffic on the roads out of junction B if the junction is part of such a planned route.

For example, if there are 10 road segments between A and B this will pr. definition imply that there are nine junctions between A and B. It is not necessary to measure traffic flow conditions on all interconnecting road segments since the traffic flow condition in one end of the route between A and B is probably identical to the traffic flow conditions in the other end of the route. However, qualifying such a situation would maybe require a measurement of the first road segment out of junction A on the route to B, and a measurement of the last road segment connected directly to junction B. However, if one knows that this route is along a planned traffic route in the city, it is not necessary to measure more than one segment somewhere on the planned traffic route since most of the traffic is on the main roads. Side roads and sub-roads being part of the planned traffic routes of the city may be more random, and may require measurement points in junctions connected with main roads to catch traffic development in and out of the main planned traffic routes instead of arranging measure point on the main roads themselves. Further, having an overview of the traffic situation in areas around the main roads makes it possible to provide live information about available alternative routes avoiding the main roads as much as possible.

In an example of assessing the number of road users that need to participate in a measurement scheme according to the present invention, if a whole area of a city is treated as equal important, it would require an evenly distributed number of road users over the whole city. In for example Oslo city, the core of the city, which often have traffic problems, is an area of 25 kilometres multiplied with 25 kilometres. If this square is divided into 10 multiplied with 10 square areas each subarea would be 2, 5 kilometres multiplied with 2.5 kilometres. Driving from one end to the other end, from any one end to anyone of the other ends would imply driving for about three to four minutes. The speed typically varies between 30 km/h to 50 km/h. Distributing one hundred road users in respective sub squares can then provide qualified traffic flow measurements of at least one road segment in the respective sub squares every three minutes in average. This number should be compared with the fact that there is about 500 000 people living in Oslo City and a large part of the population have cars, even two cars in larger families.

If one takes into account the main road aspect of cities, it is possible to allocate fixed measuring areas based on typical traffic patterns surrounding the main roads of the city. The need of providing qualified measurements in specific allocated areas can be due to a report of increasing traffic problems on parts of a main road, or there is a report of an accident in an area adjacent to a main road. Measurements can also be initiated according to historical knowledge about at which hour any rush hour actually starts.

However, the purpose when a server is instructing a road user to drive from a junction A to a junction B, the task is actually to "draw" a new road between A and B if necessary due to congestions for example, and not to verify traffic conditions as such on known existing roads between A and B.

However, the direction of the road out of junction A to junction B is actually unknown at the start of the process according to aspects of the present invention. With reference to the discussion above, it is to "draw" a path between A an B, wherein B is located closest to A among all other junctions surrounding A. It is also important to understand that when a road is identified and measured, the same road can "disappear" later on due to traffic developments. Therefore, all roads being measured may need to be periodically measured again and again.

FIG. 2 illustrates an example of embodiment of the present invention. When a server is instructing a road user to start driving out of junction 14 (being junction A selected by the server), the server should identify a junction B being located closest to junction A. Identifying B is done by establishing a pluralities of sectors with centre in the starting junction 23. Then the sever starts searching in every sector for a candidate junction being a junction located geographically closest to the starting junction among the candidate junctions inside the respective junctions. In FIG. 3 junction 24 in sector 20, 25 in sector 21, junction 26 in sector 22, junction are all candidate junctions for being junction B. In FIG. 3 junction 24 is the junction fulfilling the distance requirement.

As can be seen in FIGS. 3 and 4 sectors are overlaid another junction and for example, another road user is instructed to drive to another identified junction B as discussed with reference to FIG. 2. Whenever a road user reaches a destination B according to the present invention, the road user qualifies the road traffic measurements obtained by the movements of a car the road user is driving from A to B, for example by sending a text message and/or answering standardized questions issued by the server. If there is a congestion for example on a road segment between A and B, the road user may identify and follow an alternative route around the problematic area. The server can then track GPS positions following the alternative route, hence a "new" road between junction A and B is established. Measurements are repeated, and when the congestion is over the original road segment is probably identified as the road between A and B by another road user participating in the measurement scheme according to the present invention.

Therefore, in an example of embodiment of the present invention, a server is configured to identify a distribution of junctions, which are selected in a limited area of for example a city. The distribution can be based on a rule of even distribution making all junctions equally important in the area, or the distribution of junctions are reflecting connectivity to main roads in the area. Any other rule of distributing or selecting junctions are within the scope of the present invention.

In each junction, being part of the selected distribution a sector with centre in the junction is established. The number of sectors can be varied according to the complexity of the road topology around a junction. If there are many, short roads interconnecting many junctions the number of sectors can be low. If there are fewer roads and junctions in an area the number of sectors can be lower. Then the server identifies the closest junction B relative to the staring junction A.

Then road users being identified or is enlisted to be part of the measurement scheme according to the present invention can be tracked by the server to be close to a starting junction A, or be instructed by the server to drive to a certain starting junction A. The server is then tracking GPS data sent from the road user and when the road user reaches a destination B the measurements are qualified as discussed above. Since roads may be blocked, recorded movements of the road user reflects possible alternative roads with acceptable transport capacity. Keeping track of routes and the measurements followed by respective road users can be done in a directed graph as depicted in FIG. 5. Each node, representing junctions, of the graph may store measurement values of respective traffic flow parameters and the road user qualifiers together with other information influencing traffic flow. For example, temporary roadwork observed by a road user during measurements, or that a road is changed to a one-way traffic road etc.

It is possible to acquire traffic flow measurements from a plurality of road users and store results in the respective nodes of the graph. Then statistical analysis can be applied to provide traffic flow predictions for example.

Then by parsing the recorded traffic measurements on a regular basis, or due to an external request to a server, the server can provide updates of traffic flow conditions. The result of the assessments can be used to update maps of the areas by for example colouring blocked roads with red, open roads with green and roads in transitional sate with yellow, as known in prior art. It is also possible to compare the directed graph as depicted in FIG. 5, and update visibility of roads by for example, removing temporally a blocked road from the map, and also identify roads that has not been measured. Instead, it can be possible to display an indication based on historical knowledge of traffic situations on non-measured roads, for example if it is known that a road usually have low traffic load, the road can be displayed with green dots along the road segment.

It is within the scope of the present invention to distribute traffic flow assessments to users of the method and system thereof in any form requested by the users of the system.

Another interesting aspect of the method of establishing sectors around junctions and searching for road connections in respective sectors is when making a map out of information of location of junctions in an area. A map-generating algorithm would then start by identifying a set of points, which can be junctions and their geographical location, for example the GPS position of junctions or points. Then the method of applying sectors in respective junctions or points are applied.

Therefore, the following method steps can be used when making a map:
 specify a region;
 identify sample points (for example junctions) that cover the region;
 create X equivalent sectors around each of the sample points that cover the full circle;
 for each sample point A and each of its sectors: identify k closest points in a sector and request shortest paths from/to A to the k closest points;
 store all paths into a directed graph, wherein the nodes represent the points;
 verify stored graphs by tracking cars following routes between nodes of the stored graph.

The only major difference between the method of drawing a map as disclosed above and providing traffic flow measurements is the last step. According to a method of measuring traffic flow conditions according to the present invention, the method comprise the following method steps:
 specify a region;
 identify sample points (for example junctions) that cover the region;
 create X equivalent sectors around each of the sample points that cover the full circle;
 for each sample point A and each of its sectors: identify k closest points in a sector and identify shortest paths from/to A to the k closest points;
 store all paths into a directed graph, wherein the nodes represent the points;
 update traffic flow measurements and road user qualifiers in nodes of the graphs by tracking cars following respective shortest routes between shortest path between a node A and a closest point k in each respective sector of selected sampling points in the region.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A computer implemented method providing measurements of traffic flow conditions on roads selected by linear road sampling, wherein a server comprising the computer implemented method is configured to execute steps of:
 a) specify a region covering a road system to be measured;
 b) identify sample junctions that cover the region according to a specific rule of coverage;
 c) create a plurality of equivalent sectors around each of the sample junctions that cover the full circle around the respective sample junctions;
 d) for each sample junction and each of its sectors: identify closest junctions in a sector and identify shortest paths from/to sample junction to the closest junctions;
 e) store all paths into a directed graph, wherein nodes represent the junctions;
 f) update traffic flow measurements and measurements qualified by road users in nodes of the graphs by tracking cars following respective shortest paths identified in step d) providing recorded traffic measurements, wherein tracking cars is performed by the server using a satellite navigation system, and wherein the server is further configured to parse the recorded traffic measurements thereby providing updates of traffic flow conditions.

2. The method according to claim 1, wherein step f) further comprises identifying an alternative path between the sample point and the closest junction if a measured or otherwise identified traffic flow condition indicates that the path recorded in the direct graph is blocked.

3. The method according to claim 1, wherein the step of tracking cars comprises a step wherein the server is configured to select a specific road user to be part of the measurement.

4. The method according to claim 1, wherein the rule of step b) comprises selecting sample points being in sub regions adjacent to main roads in the region.

5. The method according to claim 1, wherein the rule of step b) comprises selecting sample points being evenly geographically distributed in the selected region.

6. The method according to claim 1, wherein step f) is executed periodically.

7. The method according to claim 6 wherein step f) is executed according to an external request to the server.

8. The method according to claim 1, wherein step f) verify stored graphs by tracking cars following routes between nodes of the stored graph, thereby enabling drawing of a map.

9. A server system configured to execute a method according to claim 1.

10. A server system configured to execute a method according to claim 8.

* * * * *